(12) United States Patent
Yang et al.

(10) Patent No.: US 9,236,806 B2
(45) Date of Patent: Jan. 12, 2016

(54) METHOD AND APPARATUS FOR CONTROLLING PROGRAMMABLE POWER CONVERTER WITH LOW STANDBY POWER LOSS

(71) Applicant: SYSTEM GENERAL CORP., Taipei Hsien (TW)

(72) Inventors: Ta-Yung Yang, Milpitas, CA (US); Chou-Sheng Wang, Keelung (TW); Pei-Sheng Tsu, New Taipei (TW); Yi-Min Hsu, Taichung (TW)

(73) Assignee: System General Corp., Taipei Hsien (TW)

( * ) Notice: Subject to any disclaimer, the term of this patent is extended or adjusted under 35 U.S.C. 154(b) by 167 days.

(21) Appl. No.: 14/154,333

(22) Filed: Jan. 14, 2014

(65) Prior Publication Data

US 2014/0198535 A1 Jul. 17, 2014

Related U.S. Application Data

(60) Provisional application No. 61/752,503, filed on Jan. 15, 2013.

(51) Int. Cl.
*H02M 3/335* (2006.01)
*H02M 1/00* (2007.01)

(52) U.S. Cl.
CPC ...... *H02M 3/33523* (2013.01); *H02M 3/33515* (2013.01); *H02M 2001/0032* (2013.01); *Y02B 70/16* (2013.01)

(58) Field of Classification Search
CPC ............ H02M 3/335; H02M 3/33507; H02M 3/33523; H02M 3/33515; H02M 3/33538; H02M 3/33546; H02M 3/33553
USPC ......... 363/15, 16, 21.04, 21.05, 21.12, 21.13, 363/123–124; 323/234, 237, 265–266
See application file for complete search history.

(56) References Cited

U.S. PATENT DOCUMENTS

| | | | |
|---|---|---|---|
| 6,323,733 B1 * | 11/2001 | Gorcea et al. | 330/297 |
| 6,977,824 B1 | 12/2005 | Yang et al. | |
| 7,016,204 B2 | 3/2006 | Yang et al. | |
| 7,352,595 B2 | 4/2008 | Yang et al. | |
| 2006/0114699 A1 * | 6/2006 | Suekuni | 363/21.07 |
| 2008/0061045 A1 * | 3/2008 | Eldridge | 219/130.1 |
| 2008/0174277 A1 * | 7/2008 | Ueno | 320/138 |
| 2009/0200996 A1 * | 8/2009 | Ojanen et al. | 323/234 |
| 2011/0188334 A1 * | 8/2011 | Kang et al. | 365/226 |

\* cited by examiner

*Primary Examiner* — Jeffrey Gblende
(74) *Attorney, Agent, or Firm* — Rosenberg, Klein & Lee

(57) ABSTRACT

Method and apparatus for controlling a programmable power converter are provided. The method and apparatus generate a first power source and a second power source. The voltage level of the second power source is lower than the voltage level of the first power source. The first power source and the second power source provide a power supply for a control circuit. The control circuit will use the first power source as its power supply when the first power source is low. The control circuit will use the second power source as its power supply for saving the power when the first power source is high.

18 Claims, 12 Drawing Sheets

METHOD AND APPARATUS FOR CONTROLLING PROGRAMMABLE POWER CONVERTER WITH LOW STANDBY POWER LOSS

REFERENCE TO RELATED APPLICATION

This Application is based on Provisional Patent Application Ser. No. 61/752,503, filed 15 Jan. 2013.

BACKGROUND OF THE INVENTION

1. Field of Invention

The present invention relates to a programmable power converter, and more specifically relates to method and apparatus for controlling the programmable power converter.

2. Description of the Related Art

A programmable power converter provides a wide range of the output voltage and the output current, such as 5V~20V and 0.5 A~5 A. In general, it would be difficult to achieve low standby power and good protections. The present invention is developed to solve this problem and achieve a low standby power loss programmable power converter.

BRIEF SUMMARY OF THE INVENTION

The objective of the present invention is to provide a method and an apparatus for controlling a programmable power converter with low standby power loss.

A method for controlling a programmable power converter according to the present invention comprises generating a programmable reference signal for regulating an output voltage of the power converter; generating a feedback signal in accordance with the programmable reference signal and the output voltage; generating a switching signal coupled to switch a transformer for generating the output voltage in accordance with the feedback signal; generating a first power source and a second power source. The voltage level of the second power source is lower than the voltage level of the first power source. The first power source and the second power source provide a power supply for a control circuit generating the programmable reference signal and the feedback signal. The control circuit will use the first power source as its power supply when the voltage level of the first power source is lower than a threshold. The control circuit will use the second power source as its power supply when the voltage level of the first power source is higher than the threshold.

An apparatus for controlling a programmable power converter according to the present invention comprises a control circuit, a switching controller, and a power generator. The control circuit generates a programmable reference signal for regulating an output voltage of the power converter. The control circuit generates a feedback signal in accordance with the programmable reference signal and the output voltage. The switching controller generates a switching signal coupled to switch a transformer for generating the output voltage in accordance with the feedback signal. The power generator is coupled to the transformer for generating a first power source and a second power source. The voltage level of the second power source is lower than the voltage level of the first power source. The first power source and the second power source provide a power supply for the control circuit. The control circuit will use the first power source as its power supply when the voltage level of the first power source is lower than a threshold. The control circuit will use the second power source as its power supply when the voltage level of the first power source is higher than the threshold.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
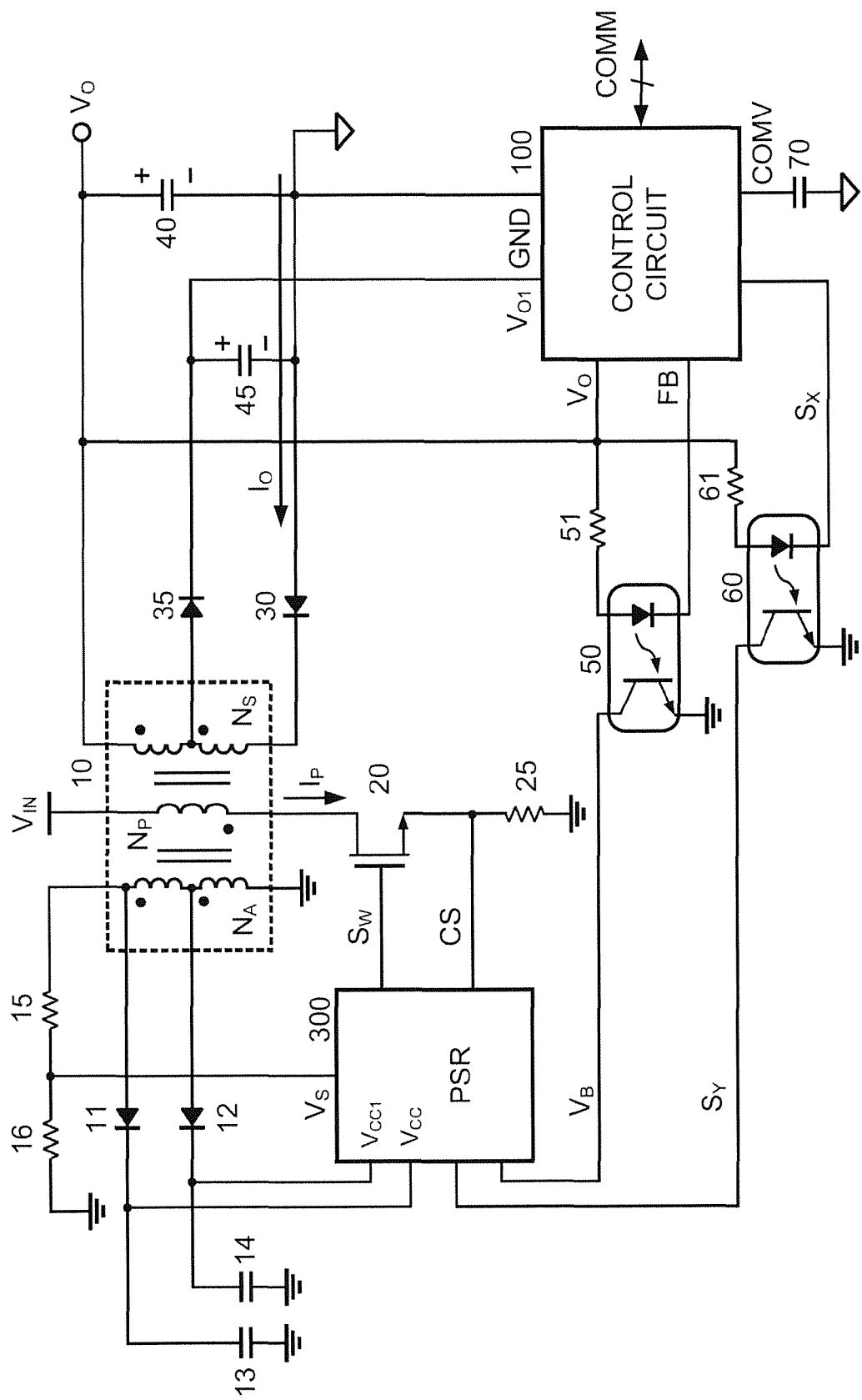
FIG. 1 is a circuit diagram of an embodiment of a programmable power converter according to the present invention.

FIG. 1 is a circuit diagram of an embodiment of a programmable power converter according to the present invention. A control circuit 100 is coupled to receive an output voltage $V_O$ from an output terminal of the programmable power converter to detect the output voltage $V_O$ for developing the feedback loop. The control circuit 100 generates a feedback signal FB coupled to a switching controller (PSR) 300 through a first signal-transfer device, such as an opto-coupler 50, for regulating the output voltage $V_O$.

A capacitor 70 coupled to the control circuit 100 is applied to compensate the voltage feedback-loop for regulating the output voltage $V_O$. The control circuit 100 generates a control signal $S_X$ coupled to control the switching controller 300 through a second signal-transfer device, such as an opto-coupler 60. The control signal $S_X$ is used for programming of the switching controller 300 and the protections. A resistor 51 is coupled to the opto-coupler 50 and receives the output voltage $V_O$ from the output terminal of the programmable power converter. The resistor 51 is utilized to bias the operating current of the opto-coupler 50. A resistor 61 is coupled to the opto-coupler 60 and receives the output voltage $V_O$ of the programmable power converter. The resistor 61 is applied to limit the current of the opto-coupler 60. The control circuit 100 includes a communication interface COMM, (e.g. USB-PD, IEEE UPAMD 1823, one-wire communication, etc.) for the communication with the external devices, such as mobile phone, tablet-PC, Notebook-PC, etc.

The opto-coupler 50 will generate a feedback signal $V_B$ coupled to the switching controller 300 in accordance with the feedback signal FB. The opto-coupler 60 will generate a control signal $S_Y$ coupled to the switching controller 300 in response to the control signal $S_X$. The control signal $S_Y$ represents the control signal $S_X$. The switching controller 300 generates a switching signal $S_W$ for switching a primary winding $N_P$ of a transformer 10 and generating the output voltage $V_O$ and an output current $I_O$ at the secondary side of the transformer 10 through a secondary winding $N_S$, a rectifier 30, and an output capacitor 40. The secondary winding $N_S$ includes two windings. The output capacitor 40 is coupled to the output terminal of the programmable power converter. A first terminal of the primary winding $N_P$ receives an input voltage $V_{IN}$. A transistor 20 is coupled to a second terminal of the primary winding $N_P$ to switch the transformer 10 in response to the switching signal $S_W$.

An auxiliary winding $N_A$ of the transformer 10 produces a reflected signal $V_S$ coupled to the switching controller 300 via a voltage divider developed by resistors 15 and 16. The reflected signal $V_S$ is correlated to the output voltage $V_O$. A resistor 25 is coupled between the transistor 20 and a ground to sense a switching current $I_P$ of the transformer 10 for generating a current signal CS coupled to the switching controller 300. The switching controller 300 generates the switching signal $S_W$ in accordance with the feedback signal $V_B$, the control signal $S_Y$, the reflected signal $V_S$, and the current signal CS. The control circuit 100 is in the secondary side of the transformer 10. The switching controller 300 is in the primary side of the transformer 10.

The programmable power converter includes a power generator for generating a first power source and a second power source $V_{O1}$. The power generator is coupled to the secondary winding $N_S$ of the transformer 10. The power generator comprises the rectifier 30, the output capacitor 40, a diode 35, and a capacitor 45. The output voltage $V_O$ generated through the rectifier 30 and the output capacitor 40 provides the first power source to supply the power to the control circuit 100. Through the diode 35 and the capacitor 45, the transformer 10 further generates the second power source $V_{O1}$ to supply the power to the control circuit 100.

An anode of the diode 35 is coupled to the secondary winding $N_S$. The capacitor 45 is coupled between a cathode of the diode 35 and the ground. The control circuit 100 will enable the output voltage $V_O$ as its power supply when the voltage level of the output voltage $V_O$ is low. Once the output voltage $V_O$ becomes a high voltage, the control circuit 100 will switch its power supply to the second power source $V_{O1}$ for saving the power. That is, the control circuit 100 will use the second power source $V_{O1}$ as its power supply once the output voltage $V_O$ becomes the high voltage. The voltage level of the second power source $V_{O1}$ is lower than the voltage level of the output voltage $V_O$ (the first power source).

Furthermore, the programmable power converter includes a voltage generator for generating a first power supply voltage $V_{CC}$ and a second power supply voltage $V_{CC1}$. The voltage generator is coupled to the auxiliary winding $N_A$ of the transformer 10. The voltage generator comprises diodes 11, 12 and capacitors 13, 14. The transformer 10 generates the first power supply voltage $V_{CC}$ to supply the power to the switching controller 300 via the diode 11 and the capacitor 13. An anode of the diode 11 is coupled to the auxiliary winding $N_A$ of the transformer 10. The capacitor 13 is coupled between a cathode of the diode 11 and the ground. The auxiliary winding $N_A$ includes two windings. Through the diode 12 and the capacitor 14, the transformer 10 produces the second power supply voltage $V_{CC1}$ to supply the power to the switching controller 300. An anode of the diode 12 is coupled to the auxiliary winding $N_A$. The capacitor 14 is coupled between a cathode of the diode 12 and the ground.

The switching controller 300 will enable the first power supply voltage $V_{CC}$ as its power supply when the voltage level of the first power supply voltage $V_{CC}$ is low. Once the first power supply voltage $V_{CC}$ becomes a high voltage, the switching controller 300 will switch its power supply to the second power supply voltage $V_{CC1}$ for saving the power. That is, the switching controller 300 will use the second power supply voltage $V_{CC1}$ as its power supply once the first power supply voltage $V_{CC}$ becomes the high voltage. The voltage level of the second power supply voltage $V_{CC1}$ is lower than the voltage level of the first power supply voltage $V_{CC}$.

Figure 2:
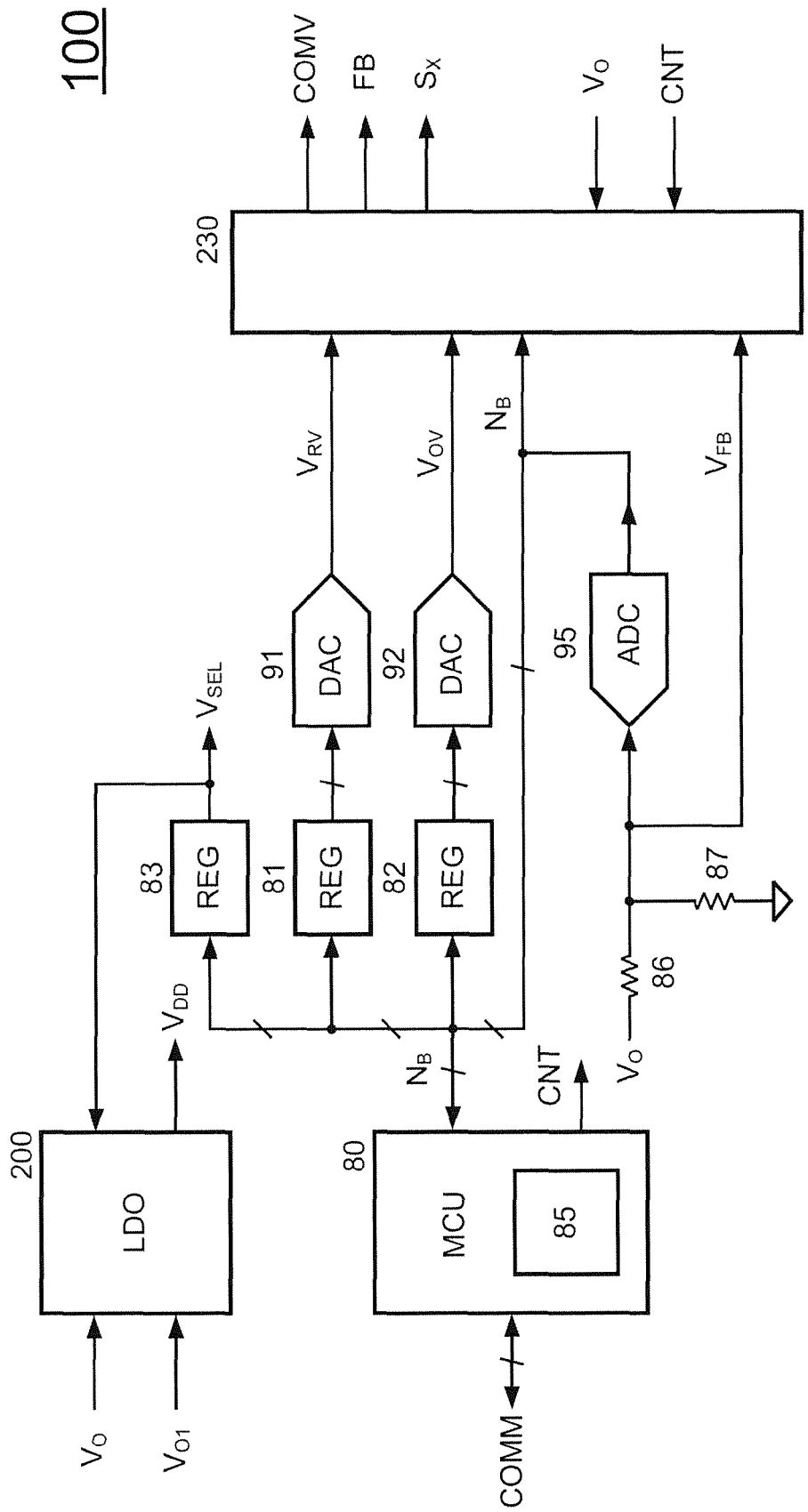
FIG. 2 is a circuit diagram of an embodiment of the control circuit according to the present invention.

FIG. 2 is a circuit diagram of an embodiment of the control circuit 100 according to the present invention. An embedded micro-controller (MCU) 80 has a memory 85 including a program memory and a data memory. The micro-controller 80 generates a control signal CNT and a control-bus signal $N_B$. The control-bus signal $N_B$ is bi-direction (input/output). The micro-controller 80 includes the communication interface COMM to communicate with the host and/or the I/O devices. The control-bus signal $N_B$ is coupled to control an analog-to-digital converter (ADC) 95 and digital-to-analog converters (DAC) 91, 92. The digital-to-analog converters 91 and 92 are controlled by the embedded micro-controller 80 through the control-bus signal $N_B$ and registers (REG) 81 and 82. The registers 81 and 82 have reference values. The control-bus signal $N_B$ is utilized to set the reference values.

A register (REG) 83 is also controlled by the control-bus signal $N_B$ for generating a power-source-selection signal $V_{SEL}$. A power-supply circuit (LDO) 200 is coupled to receive the output voltage $V_O$ (the first power source) and the second power source $V_{O1}$ for generating a first regulated power source $V_{DD}$ to supply the power for the circuits of the control circuit 100. The power-supply circuit 200 further receives the power-source-selection signal $V_{SEL}$ to select the output voltage $V_O$ (the first power source) or the second power source $V_{O1}$ for generating the regulated power source $V_{DD}$.

Resistors 86 and 87 develop a voltage divider to generate a feedback signal $V_{FB}$ in accordance with the output voltage $V_O$. The feedback signal $V_{FB}$ is coupled to the analog-to-digital converter 95 and a feedback circuit 230. That is, the analog-to-digital converter 95 is coupled to detect the output voltage $V_O$. An output terminal of the analog-to-digital converter 95 is coupled to the micro-controller 80. Therefore, via the control-bus signal $N_B$, the micro-controller 80 can read the information of the output voltage $V_O$ from the analog-to-digital converter 95.

The micro-controller 80 controls the outputs of the digital-to-analog converters 91 and 92. The first digital-to-analog converter 91 generates a voltage-reference signal $V_{RV}$ in response to the reference value of the first register 81 for controlling the output voltage $V_O$. The second digital-to-analog converter 92 generates an over-voltage reference threshold $V_{OV}$ in response to the reference value of the second register 82 for the over-voltage protection. Therefore, the digital-to-analog converters 91 and 92 are operated as a reference generation circuit to generate the voltage-reference signal $V_{RV}$ and the over-voltage reference threshold $V_{OV}$. The voltage-reference signal $V_{RV}$ and the over-voltage reference threshold $V_{OV}$ are programmable reference signal. The micro-controller 80 will control the over-voltage reference threshold $V_{OV}$ in accordance with the voltage level of the output voltage $V_O$.

The registers 81 and 82 will be reset to provide an initial value in response to the power-on of the control circuit 100.

For example, the initial value of the first register 81 will be utilized to produce a minimum value of the voltage-reference signal $V_{RV}$ that is used to generate a 5V output voltage $V_O$. In other words, the voltage-reference signal $V_{RV}$ and the over-voltage reference threshold $V_{OV}$ will be reset to the initial value in response to the power-on of the power converter. The feedback circuit 230 generates a voltage-feedback signal COMV, the feedback signal FB, and the control signal $S_X$ in response to the voltage-reference signal $V_{RV}$, the over-voltage reference threshold $V_{OV}$, the output voltage $V_O$, the feedback signal $V_{FB}$, the control signal CNT, and the control-bus signal $N_B$. The feedback circuit 230 is coupled to detect the output voltage $V_O$ for generating the feedback signal FB in accordance with the feedback signal $V_{FB}$ and the voltage-reference signal $V_{RV}$. The feedback signal FB is transferred from the feedback circuit 230 to the switching controller 300 by the opto-coupler 50 (as shown in FIG. 1).

Figure 3:
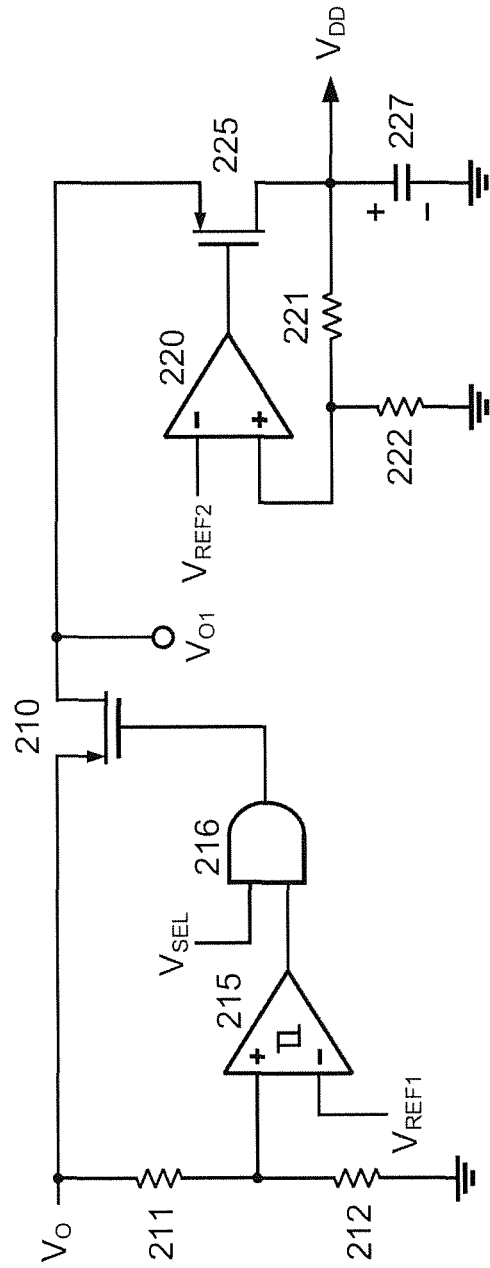
FIG. 3 is a circuit diagram of an embodiment of the power-supply circuit according to the present invention.

FIG. 3 is a circuit diagram of an embodiment of the power-supply circuit 200 according to the present invention. A voltage divider developed by resistors 211 and 212 receives the output voltage $V_O$ (the first power source) to attenuate the output voltage $V_O$. A positive input terminal of a comparator 215 is coupled to the joint of the resistors 211 and 212 to receive the attenuated output voltage $V_O$. A reference voltage $V_{REF1}$ is supplied with a negative input terminal of the comparator 215. The comparator 215 compares the attenuated output voltage $V_O$ with the reference voltage $V_{REF1}$. An output terminal of the comparator 215 is coupled to an input terminal of an AND gate 216 to control a transistor 210. An output terminal of the AND gate 216 is coupled to a gate of the transistor 210. A source of the transistor 210 is coupled to receive the output voltage $V_O$. The second power source $V_{O1}$ is coupled to a drain of the transistor 210.

The comparator 215 is coupled to receive the output voltage $V_O$ (the first power source) via the voltage divider to turn on the transistor 210 when the attenuated output voltage $V_O$ is lower than the reference voltage $V_{REF1}$. The power-source-selection signal $V_{SEL}$ is also coupled to the AND gate 216 to control the transistor 210. The comparator 215 includes a hysteresis.

An operational amplifier 220, a reference voltage $V_{REF2}$, a transistor 225, a capacitor 227, and resistors 221, 222 develop a voltage regulator to generate the regulated power source $V_{DD}$. A source of the transistor 225 is coupled to the drain of the transistor 210. The capacitor 227 is coupled between a drain of the transistor 225 and the ground to generate the regulated power source $V_{DD}$. A first terminal of the resistor 221 is coupled to the capacitor 227 to receive the regulated power source $V_{DD}$. The resistor 222 is coupled between a second terminal of the resistor 221 and the ground. A positive input terminal of the operational amplifier 220 is coupled to the joint of the resistors 221 and 222 to receive the attenuated regulated power source $V_{DD}$. The reference voltage $V_{REF2}$ is supplied with a negative input terminal of the operational amplifier 220. An output terminal of the operational amplifier 220 is coupled to a gate of the transistor 225 to control the transistor 225.

The regulated power source $V_{DD}$ is generated from the output voltage $V_O$ (the first power source) when the transistor 210 is turned on (the voltage level of the first power source $V_O$ is lower than a threshold, the threshold is correlated to the reference voltage $V_{REF1}$). If the transistor 210 is turned off (the voltage level of the first power source $V_O$ is higher than the threshold), then the regulated power source $V_{DD}$ will be generated from the second power source $V_{O1}$ for power saving.

Figure 4:
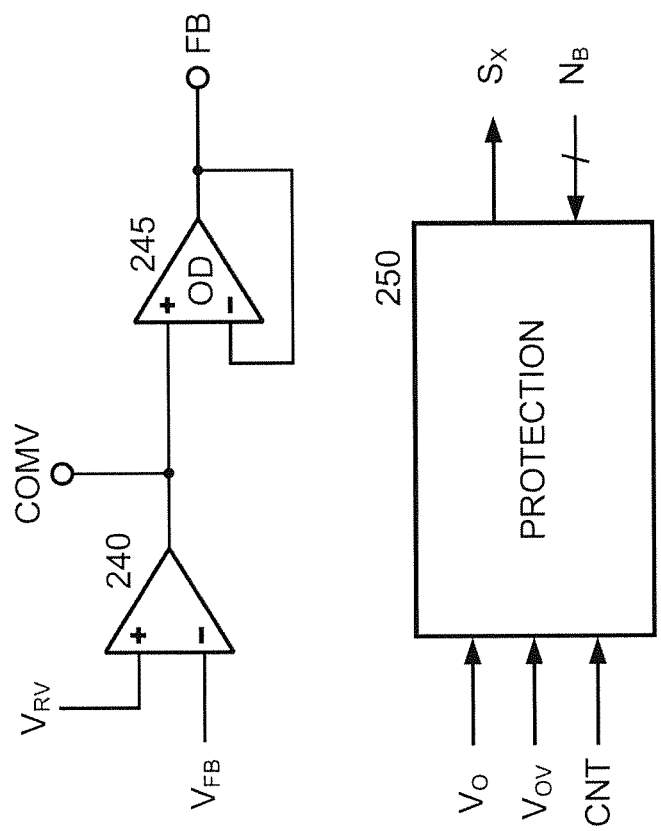
FIG. 4 is a circuit diagram of an embodiment of the feedback circuit according to the present invention.

FIG. 4 is a circuit diagram of an embodiment of the feedback circuit 230 according to the present invention. An error amplifier 240 generates the voltage-feedback signal COMV in accordance with the feedback signal $V_{FB}$ and the voltage-reference signal $V_{RV}$. The feedback signal $V_{FB}$ is coupled to a negative input terminal of the error amplifier 240. The voltage-reference signal $V_{RV}$ is supplied with a positive input terminal of the error amplifier 240. An output terminal of the error amplifier 240 outputs the voltage-feedback signal COMV. Therefore, the error amplifier 240 generates the voltage-feedback signal COMV in accordance with the output voltage $V_O$ (as shown in FIG. 1) and the voltage-reference signal $V_{RV}$. The voltage-feedback signal COMV is connected to the capacitor 70 (as shown in FIG. 1) for the loop-compensation.

The voltage-feedback signal COMV is further connected to a positive input terminal of a buffer (OD) 245 to generate the feedback signal FB. A negative input terminal of the buffer 245 is coupled to an output terminal of the buffer 245. The output of the buffer 245 is the open-drain. A protection circuit (PROTECTION) 250 generates the control signal $S_X$ in response to the over-voltage reference threshold $V_{OV}$, the output voltage $V_O$, the control signal CNT, and the control-bus signal $N_B$.

Figure 5:
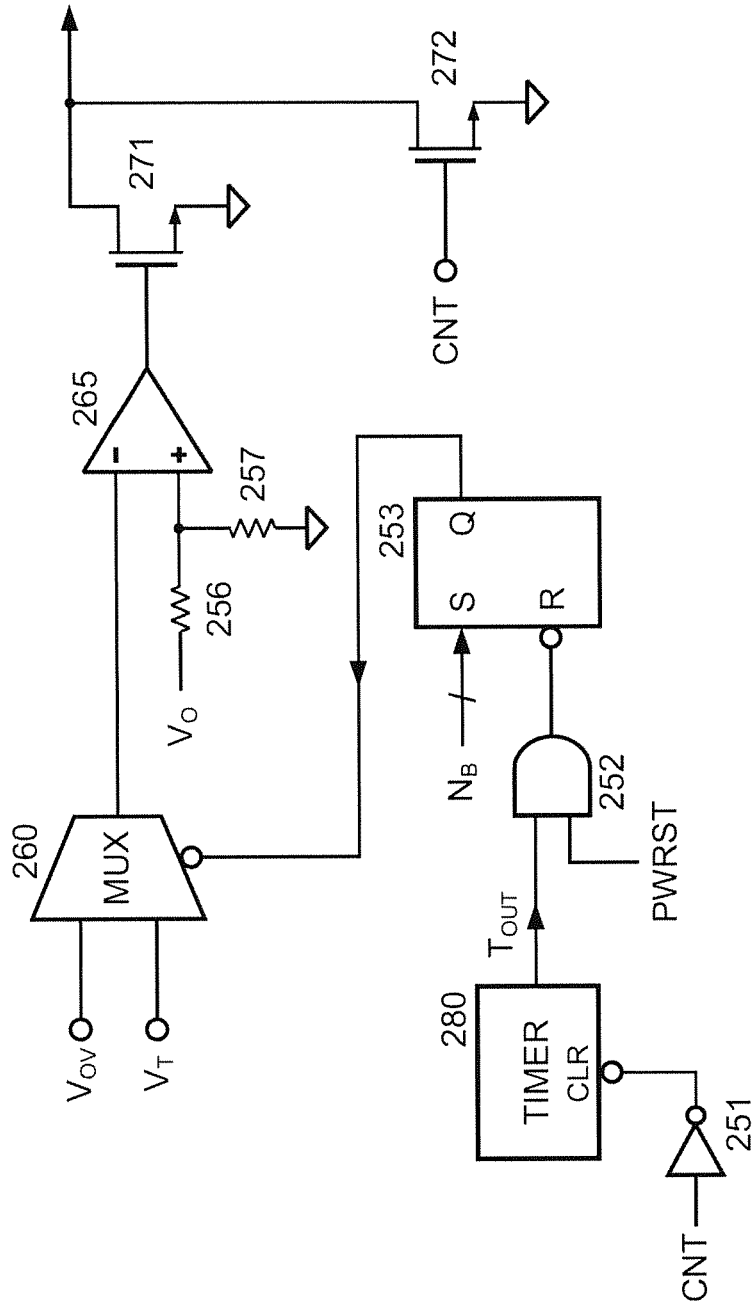
FIG. 5 is a circuit diagram of an embodiment of the protection circuit according to the present invention.

FIG. 5 is a circuit diagram of an embodiment of the protection circuit 250 according to the present invention. The control signal CNT from the micro-controller 80 (as shown in FIG. 2) is coupled to clear a timer (TIMER) 280 (watch-dog timer) via an inverter 251. The timer 280 will generate an expired signal $T_{OUT}$ (logic-low level) if the control signal CNT is not generated (logic-low level) in time periodically. The expired signal $T_{OUT}$ can be regarded as a time-out signal. The expired signal $T_{OUT}$ and a power-on reset signal PWRST are coupled to a reset input terminal R of a RS flip-flop 253 via an AND gate 252 to reset the RS flip-flop 253. The RS flip-flop 253 is set by the micro-controller 80 through the control-bus signal $N_B$. The control-bus signal $N_B$ is coupled to a set input terminal S of the RS flip-flop 253.

The over-voltage reference threshold $V_{OV}$ and a threshold $V_T$ are coupled to a multiplexer (MUX) 260. The multiplexer 260 outputs the over-voltage reference threshold $V_{OV}$ or the threshold $V_T$ as an over-voltage threshold for the over-voltage protection. Therefore, the multiplexer 260 is associated with the second register 82 and the second digital-to-analog converter 92 (as shown in FIG. 2) as a threshold generation circuit for generating the over-voltage threshold. The over-voltage reference threshold $V_{OV}$ or the threshold $V_T$ is coupled to a comparator 265 via the multiplexer 260. The multiplexer 260 is controlled by an output terminal Q of the RS flip-flop 253. When the RS flip-flop 253 is set, the over-voltage reference threshold $V_{OV}$ will be outputted to a negative input terminal of the comparator 265. If the RS flip-flop 253 is reset, the threshold $V_T$ will be outputted to the negative input terminal of the comparator 265 for the over-voltage protection. The output voltage $V_O$ is coupled to a positive input terminal of the comparator 265 through a voltage divider developed by resistors 256 and 257.

The threshold $V_T$ is a minimum threshold for the over-voltage protection. The over-voltage threshold of the over-voltage protection is programmable by the micro-controller 80 through programming the level of the over-voltage reference threshold $V_{OV}$. Therefore, the over-voltage threshold is a programmable over-voltage threshold. This over-voltage threshold will be reset as a minimum value (the threshold $V_T$) if the control signal CNT is not generated in time periodically. For example, the over-voltage threshold will be programmed to 14V for a 12V output voltage $V_O$, and the over-voltage threshold will be programmed to 6V for a 5V output voltage $V_O$. If the control signal CNT is not generated by the micro-controller 80 timely, then the over-voltage threshold will be reset to 6V even the output voltage $V_O$ is set as 12V, which will protect the power converter from abnormal operation when the micro-controller 80 is operated incorrectly. Further, the over-voltage threshold also will be reset as the minimum value in response to the power-on of the power converter.

An output signal of the comparator 265 is coupled to a gate of a transistor 271. Once the output voltage $V_O$ is higher than the over-voltage threshold (the over-voltage reference threshold $V_{OV}$ or the threshold $V_T$), the output signal of the comparator 265 drives the transistor 271 for generating the control signal $S_X$ (logic-low level). A source of the transistor 271 is coupled to the ground. A drain of the transistor 271 outputs the control signal $S_X$. Accordingly, the comparator 265 is utilized to compare the output voltage $V_O$ with the over-voltage threshold for the over-voltage protection. The comparator 265 is associated with the transistor 271 as an over-voltage protection circuit to generate the control signal $S_X$. The control signal $S_X$ serves as an over-voltage signal. As shown in FIG. 1, the control signal $S_X$ is sent to the switching controller 300 through the opto-coupler 60 to disable the switching signal $S_W$ for the over-voltage protection.

The control signal CNT from the micro-controller 80 also drives a transistor 272 to generate the control signal $S_X$. The control signal CNT is coupled to a gate of the transistor 272. A source of the transistor 272 is coupled to the ground. A drain of the transistor 272 outputs the control signal $S_X$. The outputs of the transistors 271 and 272 are parallel connected. Thus, the control signal $S_X$ is used for the protection of the power converter and the control of the micro-controller 80.

Figure 6:
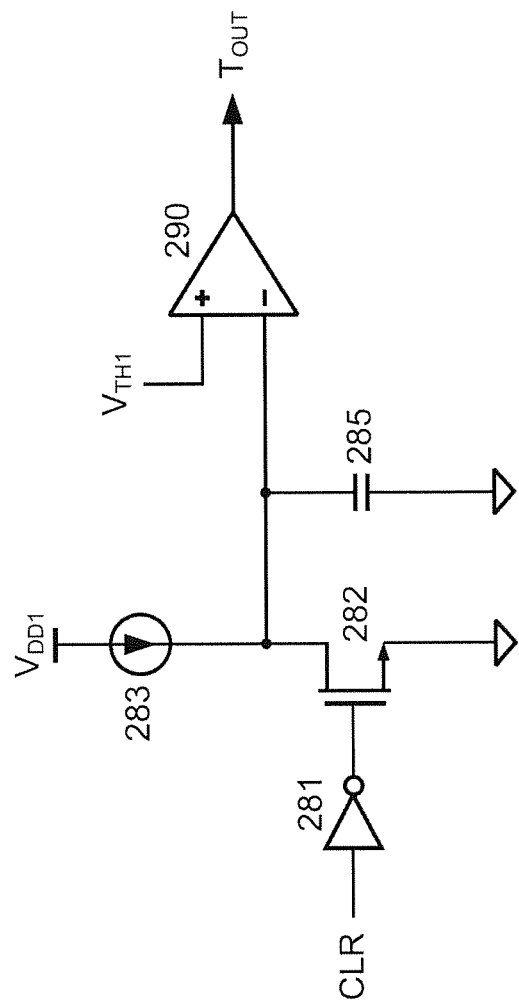
FIG. 6 is a reference circuit schematic of the timer according to the present invention.

FIG. 6 is a reference circuit schematic of the timer 280 according to the present invention. As shown in FIG. 6, the timer 280 comprises an inverter 281, a transistor 282, a constant current source 283, a capacitor 285, and a comparator 290. A first terminal of the constant current source 283 is coupled to a supply voltage $V_{DD1}$. A second terminal of the constant current source 283 is coupled to a drain of the transistor 282 and a first terminal of the capacitor 285. A source of the transistor 282 and a second terminal of the capacitor 285 are coupled to the ground. An input signal CLR of the timer 280 is coupled to a gate of the transistor 282 through the inverter 281 to control the transistor 282. In this embodiment, the input signal CLR is the inverse control signal /CNT generated from the inverter 251 shown in FIG. 5. A negative input terminal of the comparator 290 is coupled to the first terminal of the capacitor 285. A positive input terminal of the comparator 290 is coupled to receive a threshold $V_{TH1}$. The comparator 290 compares the voltage of the capacitor 285 with the threshold $V_{TH1}$ for generating the expired signal $T_{OUT}$.

The constant current source 283 is utilized to charge the capacitor 285. The input signal CLR of the timer 280 is coupled to discharge the capacitor 285 via the inverter 281 and the transistor 282. If the capacitor 285 is not discharged by the signal CLR timely, then the comparator 290 will generate the expired signal $T_{OUT}$ when the voltage of the capacitor 285 is charged and higher than the threshold $V_{TH1}$. At this time, the level of the expired signal $T_{OUT}$ is the logic-low level.

Figure 7:
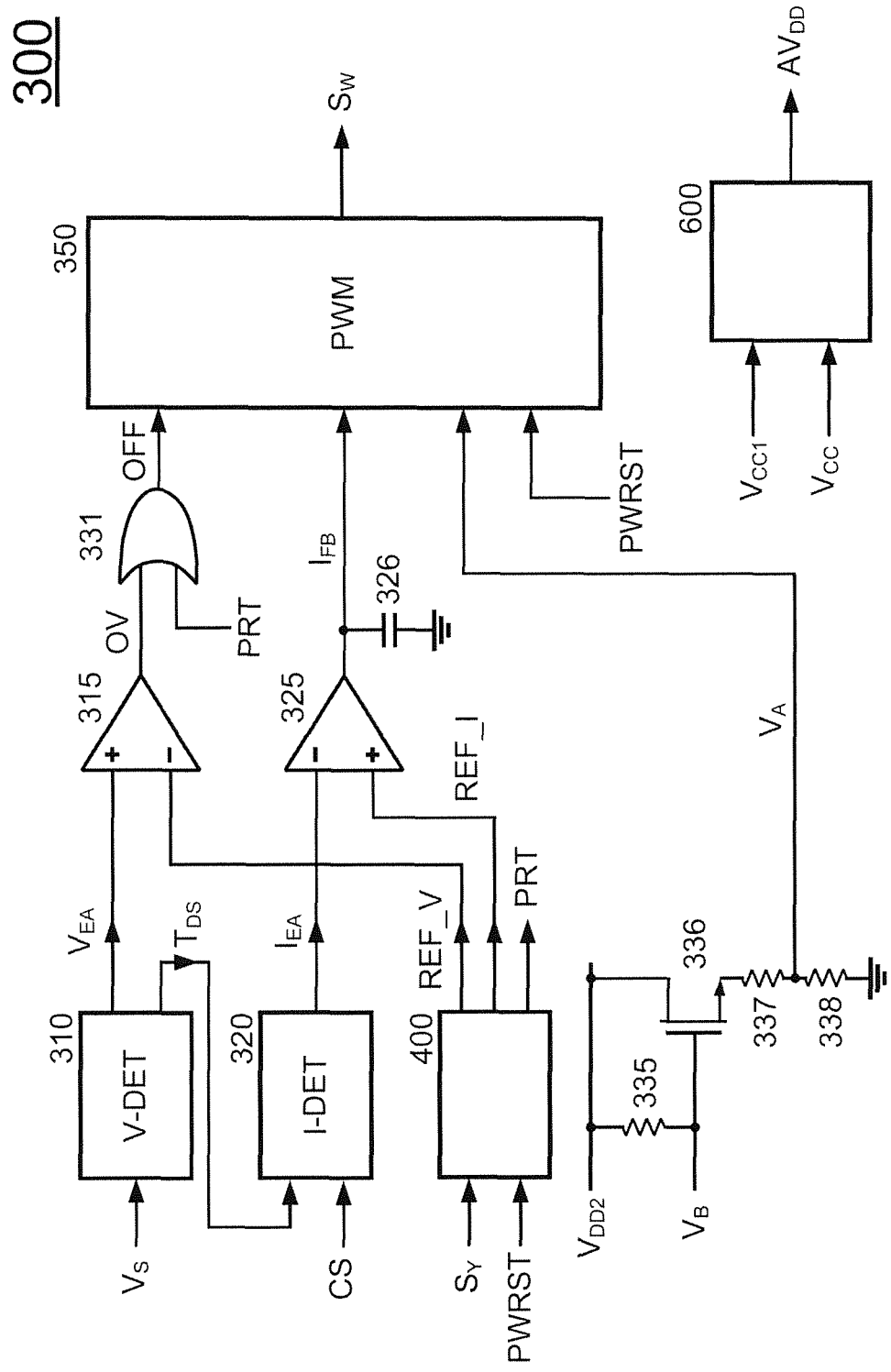
FIG. 7 is a circuit diagram of an embodiment of the switching controller according to the present invention.

FIG. 7 is a circuit diagram of an embodiment of the switching controller 300 according to the present invention. It includes a voltage detection circuit (V-DET) 310 to detect the reflected signal $V_S$ of the transformer 10 shown in FIG. 1. The voltage detection circuit 310 generates a voltage-loop signal $V_{EA}$ and a discharge time signal $T_{DS}$ in response to the reflected signal $V_S$. The voltage-loop signal $V_{EA}$ is correlated to the output voltage $V_O$ shown in FIG. 1. The discharge time signal $T_{DS}$ is correlated to the demagnetizing time of the transformer 10 shown in FIG. 1. Therefore, the switching controller 300 is coupled to detect the output voltage $V_O$ by detecting the reflected signal $V_S$ of the transformer 10.

A current detection circuit (I-DET) 320 generates a current-loop signal $I_{EA}$ in response to the current signal CS and the discharge time signal $T_{DS}$. The voltage detection circuit 310 and the current detection circuit 320 are related to the technology of the primary side regulation (PSR) of the power converter. The detail of the skill of the primary side regulation can be found in the prior arts of "Control circuit for controlling output current at the primary side of a power converter", U.S. Pat. No. 6,977,824; "Close-loop PWM controller for primary-side controlled power converters", U.S. Pat. No. 7,016,204; and "Primary-side controlled switching regulator", U.S. Pat. No. 7,352,595; etc.

The voltage-loop signal $V_{EA}$ is coupled to a positive input terminal of a comparator 315. A reference signal REF_V is supplied with a negative input terminal of the comparator 315. The voltage-loop signal $V_{EA}$ is coupled to the comparator 315 for generating an over-voltage signal OV for performing the over-voltage protection when the voltage-loop signal $V_{EA}$ is higher than the reference signal REF_V. Therefore, the switching controller 300 is coupled to detect the reflected signal $V_S$ for performing the over-voltage protection in the switching controller 300.

The current-loop signal $I_{EA}$ is coupled to a negative input terminal of an amplifier 325. A reference signal REF_I is supplied with a positive input terminal of the amplifier 325. The current-loop signal $I_{EA}$ associated with the reference signal REF_I generates a current feedback signal $I_{FB}$ for generating the switching signal $S_W$. The switching signal $S_W$ is utilized to switch the transformer 10 for regulating the output current $I_O$ (as shown in FIG. 1) of the power converter. Because the current-loop signal $I_{EA}$ is correlated to the discharge time signal $T_{DS}$, and the discharge time signal $T_{DS}$ is correlated to the demagnetizing time of the transformer 10, the switching controller 300 is coupled to detect the reflected signal $V_S$ of the transformer 10 for regulating the output current $I_O$ of the power converter in accordance with the demagnetizing time of the transformer 10.

A capacitor 326 is coupled to the current feedback signal $I_{FB}$ for the loop compensation. A programmable circuit 400 is coupled to generate the reference signals REF_V, REF_I, and a protection signal PRT in response to the control signal $S_Y$ and the power-on reset signal PWRST. The reference signal REF_V is operated as an over-voltage threshold signal for the over-voltage protection. This over-voltage protection is developed by the detection of the reflected signal $V_S$. The reference signal REF_I is operated as a current reference signal for regulating the output current $I_O$ of the power converter. Because the control signal $S_Y$ represents the control signal $S_X$ from the micro-controller 80 (as shown in FIG. 2), the reference signals REF_V and REF_I are controlled by the control signal $S_X$ for the over-voltage protection of the output voltage $V_O$ and the regulation of the output current $I_O$. That is, the reference signals REF_V and REF_I are programmable.

The protection signal PRT and the over-voltage signal OV are coupled to generate an off signal OFF via an OR gate 331. A resistor 335 is utilized to pull high the feedback signal $V_B$. The feedback signal $V_B$ is coupled to generate a secondary feedback signal $V_A$ through a level-shift circuit. The level-shift circuit comprises a transistor 336, and resistors 335, 337, 338. A drain of the transistor 336 is coupled to a supply voltage $V_{DD2}$. A first terminal of the resistor 335 is coupled to the supply voltage $V_{DD2}$ and the drain of the transistor 336. A second terminal of the resistor 335 is coupled to a gate of the transistor 336 and the feedback signal $V_B$. The gate of the transistor 336 is further coupled to receive the feedback signal $V_B$. A source of the transistor 336 is coupled to a first terminal of the resistor 337. The resistor 338 is coupled between a second terminal of the resistor 337 and the ground. The secondary feedback signal $V_A$ is generated at the joint of the resistors 337 and 338. The secondary feedback signal $V_A$ is correlated to the feedback signal $V_B$.

A PWM circuit (PWM) 350 generates the switching signal $S_W$ in response to the secondary feedback signal $V_A$, the current feedback signal $I_{FB}$, the off signal OFF, and the power-on reset signal PWRST. A power-source circuit 600 is coupled to receive the power supply voltages $V_{CC}$ and $V_{CC1}$ for generating a second regulated power source $AV_{DD}$ to supply the power to the circuits of the switching controller 300.

Figure 8:
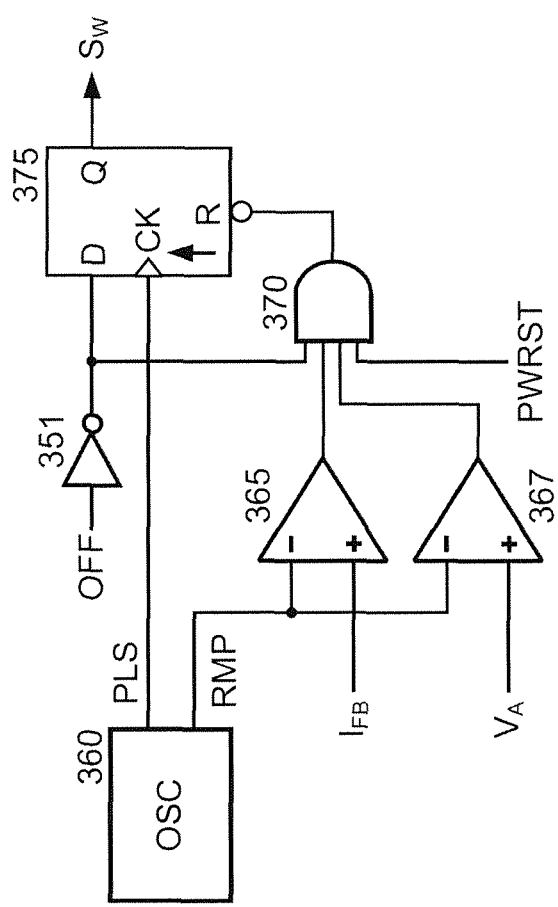
FIG. 8 is a reference circuit schematic of the PWM circuit according to the present invention.

FIG. 8 is a reference circuit schematic of the PWM circuit 350 according to the present invention. An oscillator (OSC) 360 generates a clock signal PLS and a ramp signal RMP. The clock signal PLS is coupled to a clock input terminal CK of a flip-flop 375. An output terminal Q of the flip-flop 375 outputs the switching signal $S_W$. The off signal OFF is coupled to an input terminal D of the flip-flop 375 via an inverter 351.

The ramp signal RMP is coupled to negative input terminals of comparators 365 and 367. The current feedback signal $I_{FB}$ is coupled to a positive input terminal of the comparator 365 to compare with the ramp signal RMP. The secondary feedback signal $V_A$ is coupled to a positive input terminal of the comparator 367 to compare with the ramp signal RMP. Output terminals of the comparators 365 and 367 are coupled to input terminals of an AND gate 370. The off signal OFF is further coupled to the input terminal of the AND gate 370 though the inverter 351. The power-on reset signal PWRST is also coupled to the input terminal of the AND gate 370. An output terminal of the AND gate 370 is coupled to a reset input terminal R of the flip-flop 375.

The clock signal PLS periodically enables the switching signal $S_W$ via the flip-flop 375. The switching signal $S_W$ will be disabled once the ramp signal RMP is higher than the current feedback signal $I_{FB}$ in the comparator 365 or the secondary feedback signal $V_A$ in the comparator 367. The off signal OFF is also coupled to disable the switching signal $S_W$ through the inverter 351 and the AND gate 370. The power-on reset signal PWRST is also coupled to disable the switching signal $S_W$ through the AND gate 370.

Figure 9:
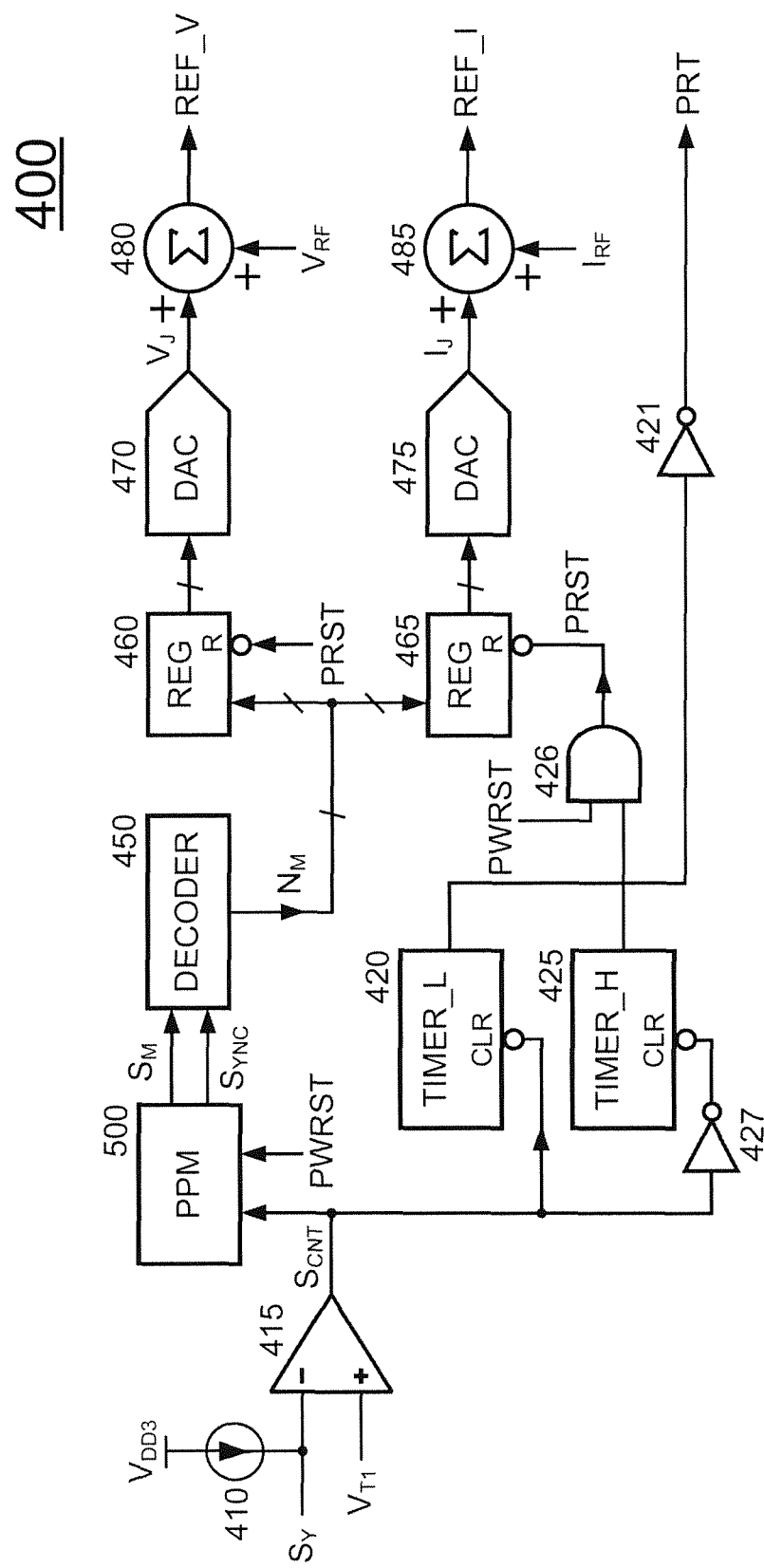
FIG. 9 is a circuit diagram of an embodiment of the programmable circuit according to the present invention.

FIG. 9 is a circuit diagram of an embodiment of the programmable circuit 400 according to the present invention. A current source 410 is connected to pull high the control signal $S_Y$. The current source 410 is coupled from a supply voltage $V_{DD3}$ to a negative input terminal of a comparator 415. The control signal $S_Y$ is also coupled to the negative input terminal of the comparator 415. The comparator 415 will generate a pulse signal $S_{CNT}$ once the control signal $S_Y$ is lower than a threshold $V_{T1}$ supplied with a positive input terminal of the comparator 415.

A pulse-position modulation circuit (PPM) 500 generates a demodulated signal $S_M$ and a synchronous signal $S_{YNC}$ in response to the pulse signal $S_{CNT}$. The pulse signal $S_{CNT}$ indicates the control signal $S_X$ of the control circuit 100 (as shown in FIG. 2). The demodulated signal $S_M$ and the synchronous signal $S_{YNC}$ are coupled to a digital-decoder (DECODER) 450 to generate a digital data $N_M$. The digital data $N_M$ is stored into a register (REG) 460 and a register (REG) 465. The register 460 outputting the digital data $N_M$ is coupled to a digital-to-analog converter (DAC) 470 for generating a voltage-adjust signal $V_J$. An add circuit 480 generates the reference signal REF_V by adding a reference signal $V_{RF}$ and the voltage-adjust signal $V_J$. The register 465 outputting the digital data $N_M$ is coupled to a digital-to-analog converter (DAC) 475 for generating a current-adjust signal h. An add circuit 485 generates the reference signal REF_I by adding a reference signal $I_{RF}$ and the current-adjust signal $I_J$. In other words, the digital data $N_M$ is utilized to generate the voltage-adjust signal $V_J$ and the current-adjust signal $I_J$ for generating the reference signals REF_V and REF_J.

Therefore, the reference signal REF_V and the reference signal REF_I can be programmed by the micro-controller 80 of the control circuit 100. The reflected signal $V_S$ of the transformer 10 (as shown in FIG. 1) is used for the over-voltage protection in the switching controller 300. The threshold (reference signal REF_V) of this over-voltage protection (for output voltage $V_O$) can be programmed by the control circuit 100 in the secondary side of the transformer 10. Furthermore, the reference signal REF_I for the output current regulation can be programmed by the control circuit 100 in the secondary side of the transformer 10, and therefore the value of the output current $I_O$ can be programmed by the control circuit 100 in the secondary side of the transformer 10.

The pulse signal $S_{CNT}$ is further coupled to a timer (TIMER_L) 420 for detecting the pulse width of the pulse signal $S_{CNT}$. That is, the timer 420 is used to detect the logic-low period of the control signal $S_X$ shown in FIG. 1. The protection signal PRT will be generated by the timer 420 via an inverter 421 if the pulse width of the pulse signal $S_{CNT}$ is over a period $T_{OV}$. The circuit of the timer 420 can be the same as the circuit of the timer 280 shown in FIG. 6. The current of the constant current source 283, the capacitance of the capacitor 285, and the value of the threshold $V_{TH1}$ determine the period $T_{OV}$.

This protection signal PRT is coupled to the OR gate 331 of the switching controller 300 (as shown in FIG. 7) to generate the off signal OFF for disabling the switching signal $S_W$. Because the control signal $S_X$ (the pulse signal $S_{CNT}$ shown in FIG. 5 will be generated greater than the period $T_{OV}$ when the over-voltage of the output voltage $V_O$ is detected by the control circuit 100 in the secondary side of the transformer 10 (as shown in FIG. 1), the switching signal $S_W$ will be disabled by the switching controller 300 once the over-voltage of the output voltage $V_O$ is detected.

Another timer (TIMER_H) 425 is coupled to receive the pulse signal $S_{CNT}$ through an inverter 427. An output terminal of the timer 425 is coupled to an AND gate 426. The timer 425 will generate a reset signal PRST via the AND gate 426 once the pulse signal $S_{CNT}$ is not generated over a specific period $T_{OT}$. The circuit of the timer 425 can be the same as the circuit of the timer 280 shown in FIG. 6. The current of the constant current source 283, the capacitance of the capacitor 285, and the value of the threshold $V_{TH1}$ determine the period $T_{OT}$. The power-on reset signal PWRST is also coupled to the AND gate 426 to generate the reset signal PRST through the AND gate 426. The reset signal PRST is coupled to clear the registers 460 and 465 for resetting the value of the voltage-adjust signal $V_J$ and the current-adjust signal $I_J$ to the zero.

Therefore, the reference signal REF_V will be set to a minimum value (reference signal $V_{RF}$), that is the initial value, for the over-voltage protection once the control signal $S_X$ is not generated by the control circuit 100 in time periodically or the power converter is powered on. Besides, the reference signal REF_I will be set to a minimum value (reference signal $I_{RF}$), that is the initial value, for regulating the output current $I_O$ once the control signal $S_X$ is not generated by the control circuit 100 in time periodically or the power converter is powered on. Therefore, if the micro-controller 80 is not operated properly, then the threshold (reference signal REF_V) for the over-voltage protection and the reference signal REF_I for the output current regulation will be reset to the minimum value for the protection and regulating the power converter.

Consequently, the control signal $S_X$ generated by the control circuit 100 is used for, (1) the over-voltage protection when the over-voltage is detected in the control circuit 100;

(2) the communication for setting the over-voltage threshold (REF_V) and the current reference signal (REF_I) in the switching controller 300;

(3) resetting the timer 425 in the switching controller 300 to ensure the control circuit 100 being operated properly, otherwise the over-voltage threshold (REF_V) and the current reference signal (REF_I) of the switching controller 300 will be reset to the minimum value for protecting and regulating the power converter.

Figure 10:
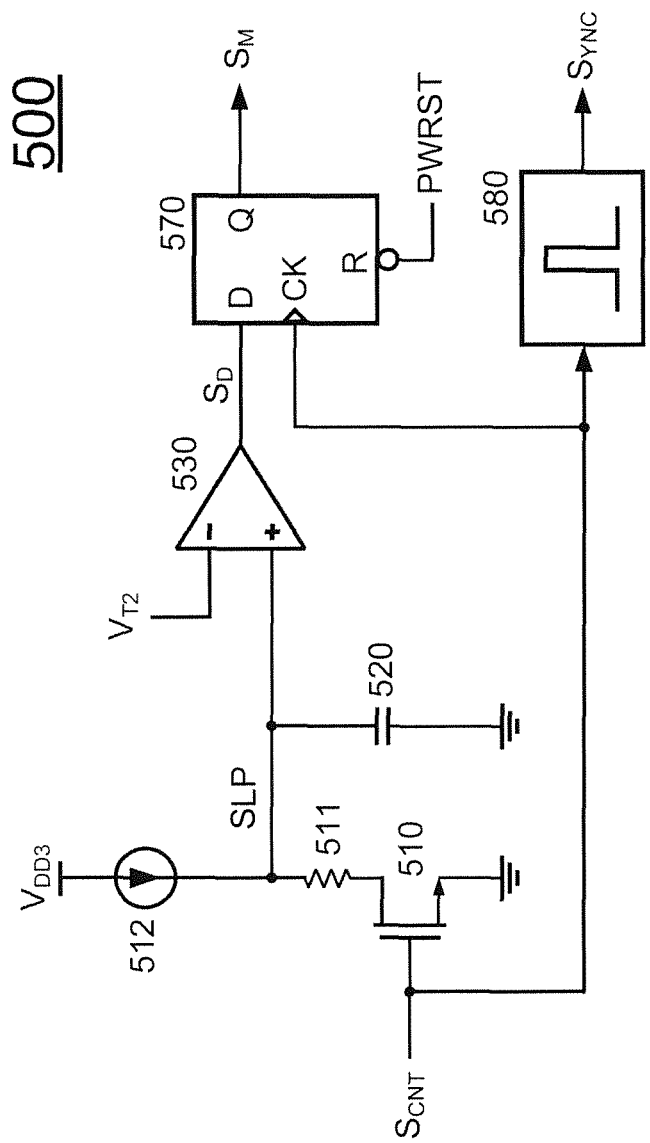
FIG. 10 is a circuit diagram of an embodiment of the pulse-position modulation circuit according to the present invention.

FIG. 10 is a circuit diagram of an embodiment of the pulse-position modulation circuit 500 according to the present invention. It operates as a de-modulator for an input signal with the pulse-position modulation, such as the control signals $S_X$, $S_Y$, and the pulse signal $S_{CNT}$. A current source 512 is coupled from the supply voltage $V_{DD3}$ to a first terminal of a capacitor 520 to charge the capacitor 520. A second terminal of the capacitor 520 is coupled to the ground. A resistor 511 is coupled between the first terminal of the capacitor 520 and a drain of a transistor 510. A source of the transistor 510 is coupled to the ground. The pulse signal $S_{CNT}$ is coupled to a gate of the transistor 510 to drive the transistor 510. The pulse signal $S_{CNT}$ is coupled to discharge the capacitor 520 through the transistor 510 and the resistor 511. A slope signal SLP is thus generated at the capacitor 520.

A positive input terminal of a comparator 530 is coupled to the first terminal of the capacitor 520. A threshold $V_{T2}$ is supplied with a negative input terminal of the comparator 530. The comparator 530 will generate a data signal $S_D$ as a logic-high level once the slope signal SLP is higher than the threshold $V_{T2}$. The data signal $S_D$ is coupled to an input terminal D of a flip-flop 570. The pulse signal $S_{CNT}$ is further coupled to a clock input terminal CK of the flip-flop 570. The data signal $S_D$ will be latched into the flip-flip 570 in response to the pulse signal $S_{CNT}$ for generating the demodulated signal $S_M$ at an output terminal Q of the flip-flop 570. The power-on reset signal PWRST is coupled to a reset input terminal R of the flip-flop 570 to reset the flip-flop 570. The pulse signal $S_{CNT}$ is further coupled to generate the synchronous signal $S_{YNC}$ through a pulse generation circuit 580. The demodulated signal $S_M$ is generated in accordance with the pulse position of the control signal $S_X$.

Figure 11:
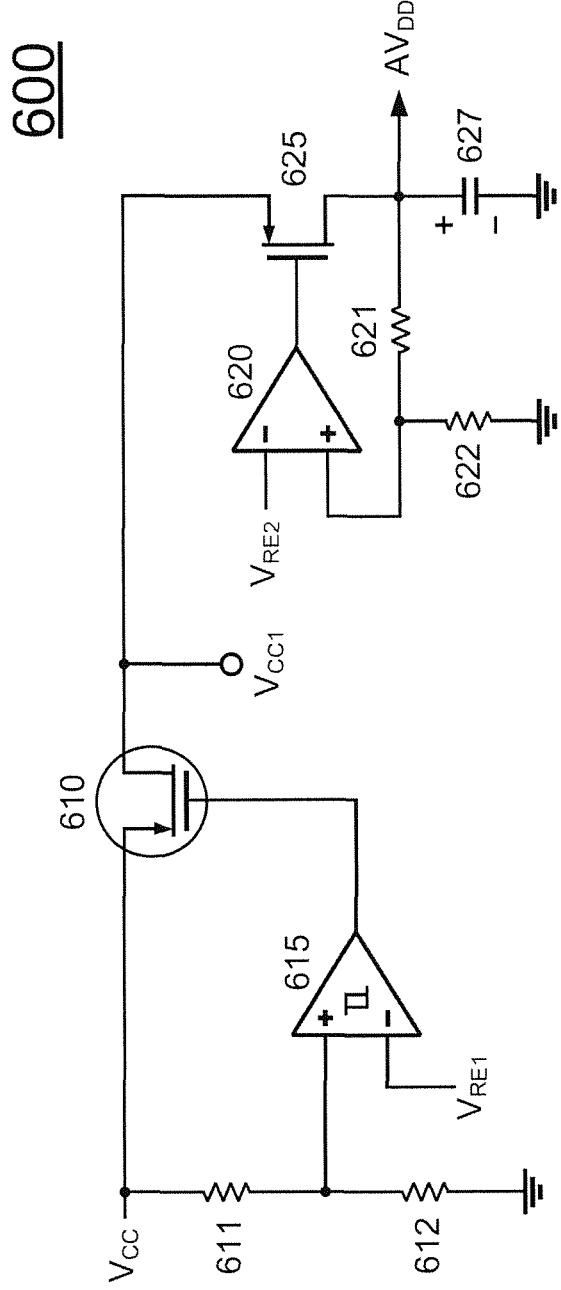
FIG. 11 is a circuit diagram of an embodiment of the power-source circuit according to the present invention.

FIG. 11 is a circuit diagram of an embodiment of the power-source circuit 600 according to the present invention. A voltage divider developed by resistors 611 and 612 receives the first power supply voltage $V_{CC}$ to attenuate the first power supply voltage $V_{CC}$. A positive input terminal of a comparator 615 is coupled to the joint of the resistors 611 and 612 to receive the attenuated first power supply voltage $V_{CC}$. A reference voltage $V_{RE1}$ is supplied with a negative input terminal of the comparator 615. The comparator 615 compares the attenuated first power supply voltage $V_{CC}$ with the reference voltage $V_{RE1}$. An output terminal of the comparator 615 is coupled to a gate of the transistor 610. A source of the transistor 610 is coupled to receive the first power supply voltage $V_{CC}$. The second power supply voltage $V_{CC1}$ is coupled to a drain of the transistor 610.

The comparator 615 is coupled to receive the first power supply voltage $V_{CC}$ via the resistors 611 and 612 for the turn-on of the transistor 610 when the attenuated first power supply voltage $V_{CC}$ is lower than the reference voltage $V_{RE1}$. The comparator 615 includes a hysteresis.

An operational amplifier 620, a reference voltage $V_{RE2}$, a transistor 625, a capacitor 627, and resistors 621, 622 develop a voltage regulator to generate the regulated power source $AV_{DD}$. A source of the transistor 625 is coupled to the drain of the transistor 610. The capacitor 627 is coupled between a drain of the transistor 625 and the ground to generate the regulated power source $AV_{DD}$. A first terminal of the resistor 621 is coupled to the capacitor 627 to receive the regulated power source $AV_{DD}$. The resistor 622 is coupled between a second terminal of the resistor 621 and the ground. A positive input terminal of the operational amplifier 620 is coupled to the joint of the resistors 621 and 622 to receive the attenuated regulated power source $AV_{DD}$. The reference voltage $V_{RE2}$ is supplied with a negative input terminal of the operational amplifier 620. An output terminal of the operational amplifier 620 is coupled to a gate of the transistor 625 to control the transistor 625.

The regulated power source $AV_{DD}$ is generated from the first power supply voltage $V_{CC}$ when the transistor 610 is turned on (the voltage level of the first power supply voltage $V_{CC}$ is lower than a threshold voltage, the threshold voltage is correlated to the reference voltage $V_{RE1}$). If the transistor 610 is turned off (the voltage level of the first power supply voltage $V_{CC}$ is higher than the threshold voltage), then the regulated power source $AV_{DD}$ will be generated from the second power supply voltage $V_{CC1}$ for power saving.

Figure 12:
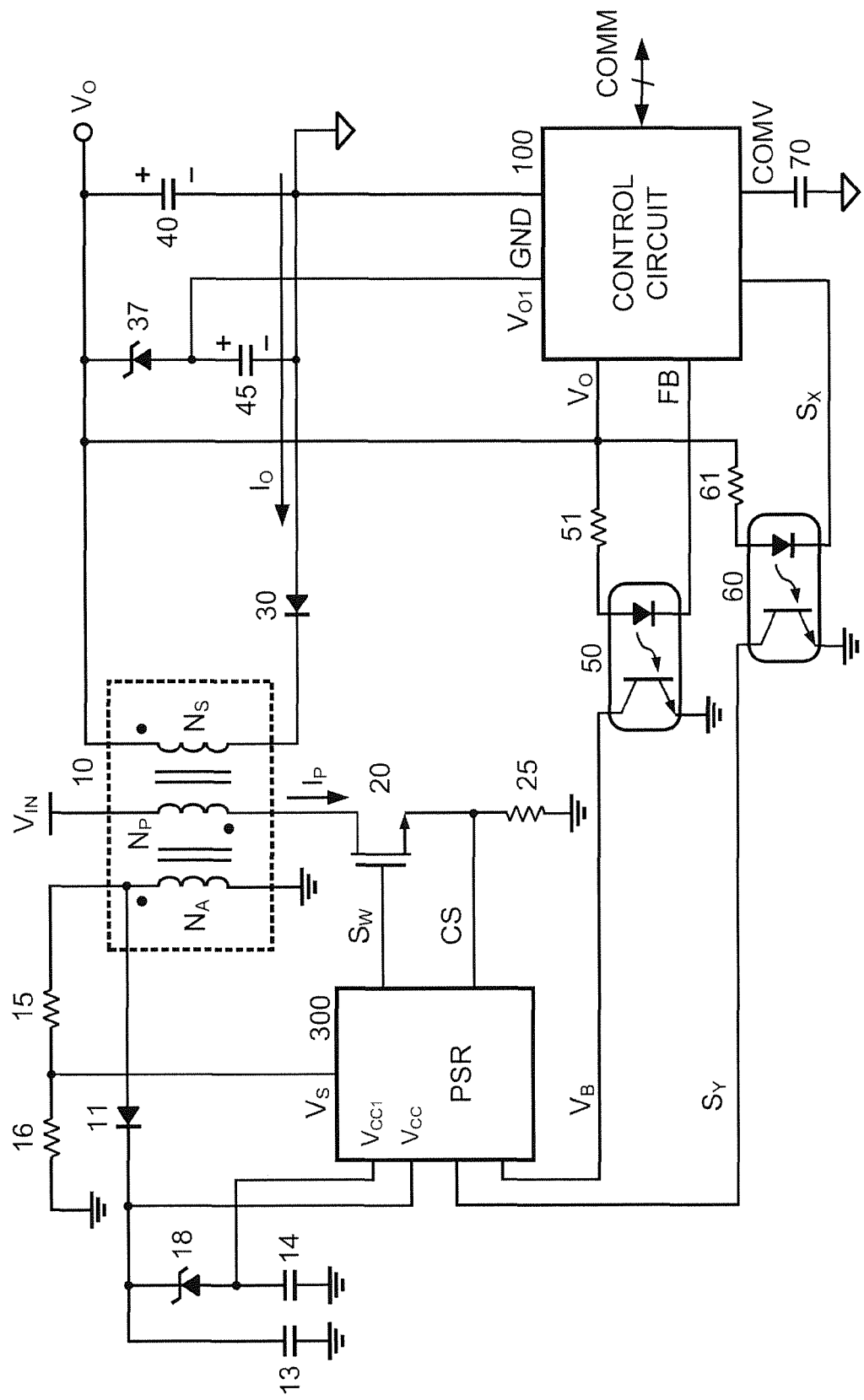
FIG. 12 is a circuit diagram of another embodiment of the programmable power converter according to the present invention.

FIG. 12 is a circuit diagram of another embodiment of the programmable power converter according to the present invention. According to this programmable power converter, the diodes 12 and 35 shown in FIG. 1 are not required. The power generator comprises the rectifier 30, the output capacitor 40, the capacitor 45, and a voltage regulation device 37 for generating the first power source (output voltage $V_O$) and the second power source $V_{O1}$. The voltage generator comprises the diode 11, the capacitors 13, 14, and a voltage regulation device 18 for generating the first power supply voltage $V_{CC}$ and the second power supply voltage $V_{CC1}$.

The output voltage $V_O$ provides the first power source to power the control circuit 100. Through the voltage regulation device 37, such as a zener diode, the output voltage $V_O$ (the first power source) further generates the second power source $V_{O1}$ to power the circuits of the control circuit 100. A first terminal of the voltage regulation device 37 is coupled to the output capacitor 40 and the output voltage $V_O$. The capacitor 45 is coupled between a second terminal of the voltage regulation device 37 and the ground for generating the second power source $V_{O1}$.

The control circuit 100 will enable the output voltage $V_O$ as its power supply when the voltage level of the output voltage $V_O$ is low. Once the output voltage $V_O$ becomes a high voltage, the control circuit 100 will switch its power supply from the second power source $V_{O1}$ for saving the power. The voltage level of the second power source $V_{O1}$ is lower than the voltage level of the output voltage $V_O$ (the first power source).

Furthermore, the transformer 10 generates the first power supply voltage $V_{CC}$ to provide the power to the circuits of the switching controller 300 via the diode 11 and the capacitor 13. Through the voltage regulation device 18, e.g. a zener diode, the first power supply voltage $V_{CC}$ further produces the second power supply voltage $V_{CC1}$ to provide the power to the circuits of the switching controller 300. A first terminal of the voltage regulation device 18 is coupled to the capacitor 13 and the first power supply voltage $V_{CC}$. The capacitor 14 is coupled between a second terminal of the voltage regulation device 18 and the ground for generating the second power supply voltage $V_{CC1}$.

The voltage level of the second power supply voltage $V_{CC1}$ is lower than the voltage level of the first power supply voltage $V_{CC}$. The switching controller 300 will enable its power supply from the first power supply voltage $V_{CC}$ when the voltage level of the first power supply voltage $V_{CC}$ is low. Once the first power supply voltage $V_{CC}$ becomes a high voltage, the switching controller 300 will switch its power supply from the second power supply voltage $V_{CC1}$ for saving the power.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A method for controlling a programmable power converter, comprising:
   generating a programmable reference signal for regulating an output voltage of the power converter;
   generating a feedback signal in accordance with the programmable reference signal and the output voltage;
   generating a switching signal coupled to switch a transformer for generating the output voltage in accordance with the feedback signal;
   generating a first power source; and
   generating a second power source;
   wherein the voltage level of the second power source is lower than the voltage level of the first power source; the first power source and the second power source provide a power supply for a control circuit generating the programmable reference signal and the feedback signal; the control circuit will use the first power source as its power supply when the voltage level of the first power source is lower than a threshold; the control circuit will use the second power source as its power supply when the voltage level of the first power source is higher than the threshold.

2. The method as claimed in claim 1, further comprising:
   generating a first power supply voltage; and
   generating a second power supply voltage;
   wherein a voltage level of the second power supply voltage is lower than a voltage level of the first power supply voltage; the first power supply voltage and the second power supply voltage provide a power supply for a switching controller for generating the switching signal; the switching controller will use the first power supply voltage as its power supply when the voltage level of the first power supply voltage is lower than a threshold voltage; the switching controller will use the second power supply voltage as its power supply when the voltage level of the first power supply voltage is higher than the threshold voltage.

3. The method as claimed in claim 1, wherein the control circuit is in a secondary side of the transformer; a switching controller is in a primary side of the transformer for generating the switching signal; the control circuit has a communication interface for communication with an external device.

4. The method as claimed in claim 1, wherein the programmable reference signal will be reset to an initial value in response to a power-on of the power converter.

5. The method as claimed in claim 1, wherein the control circuit generates a control signal coupled to program an over-voltage threshold signal in a switching controller for an over-voltage protection of the output voltage.

6. The method as claimed in claim 5, wherein the over-voltage threshold signal will be reset to an initial value in response to a power-on of the power converter.

7. The method as claimed in claim 1, wherein the control circuit generates a control signal coupled to control a programmable current reference signal in a switching controller for regulating an output current.

8. The method as claimed in claim 7, wherein the programmable current reference signal will be reset to an initial value in response to a power-on of the power converter.

9. An apparatus for controlling a programmable power converter, comprising:
   a control circuit generating a programmable reference signal for regulating an output voltage of the power converter, and generating a feedback signal in accordance with the programmable reference signal and the output voltage;
   a switching controller generating a switching signal coupled to switch a transformer for generating the output voltage in accordance with the feedback signal; and
   a power generator coupled to the transformer for generating a first power source and a second power source;
   wherein a voltage level of the second power source is lower than a voltage level of the first power source; the first power source and the second power source provide a power supply for the control circuit; the control circuit will use the first power source as its power supply when the voltage level of the first power source is lower than a threshold; the control circuit will use the second power source as its power supply when the voltage level of the first power source is higher than the threshold.

10. The apparatus as claimed in claim 9, further comprising:
    a voltage generator generating a first power supply voltage and a second power supply voltage;
    wherein a voltage level of the second power supply voltage is lower than a voltage level of the first power supply voltage; the first power supply voltage and the second power supply voltage provide a power supply for the switching controller; the switching controller will use the first power supply voltage as its power supply when the voltage level of the first power supply voltage is lower than a threshold voltage; the switching controller will use the second power supply voltage as its power supply when the voltage level of the first power supply voltage is higher than the threshold voltage.

11. The apparatus as claimed in claim 9, wherein the control circuit is in a secondary side of the transformer; the switching controller is in a primary side of the transformer; the control circuit has a communication interface for communication with an external device.

12. The apparatus as claimed in claim 9, wherein the switching controller is coupled to detect a reflected signal of the transformer for regulating an output current of the power converter in accordance with demagnetizing time of the transformer.

13. The apparatus as claimed in claim 9, wherein the switching controller is coupled to detect a reflected signal for performing an over-voltage protection in the switching controller.

14. The apparatus as claimed in claim 9, wherein the control circuit comprises:
- a threshold generation circuit generating a programmable over-voltage threshold for an over-voltage protection in the control circuit; and
- an over-voltage protection circuit coupled to generate an over-voltage signal by comparing the output voltage and the programmable over-voltage threshold;
- wherein the over-voltage signal is transferred to the switching controller; the over-voltage signal is coupled to disable the switching signal.

15. The apparatus as claimed in claim 14, wherein the programmable over-voltage threshold will be reset to a minimum threshold in response to a power-on of the power converter.

16. The apparatus as claimed in claim 9, wherein the control circuit further comprises:
- a micro-controller for generating the programmable reference signal.

17. The apparatus as claimed in claim 9, wherein the control circuit further comprises:
- an analog-to-digital converter coupled to detect the output voltage of the power converter;
- wherein an output of the analog-to-digital converter is coupled to a micro-controller of the control circuit.

18. The apparatus as claimed in claim 9, wherein the control circuit comprises:
- a reference generation circuit coupled to generate the programmable reference signal; and
- a feedback circuit coupled to detect the output voltage for generating the feedback signal in accordance with the programmable reference signal.

* * * * *